Figure 1:
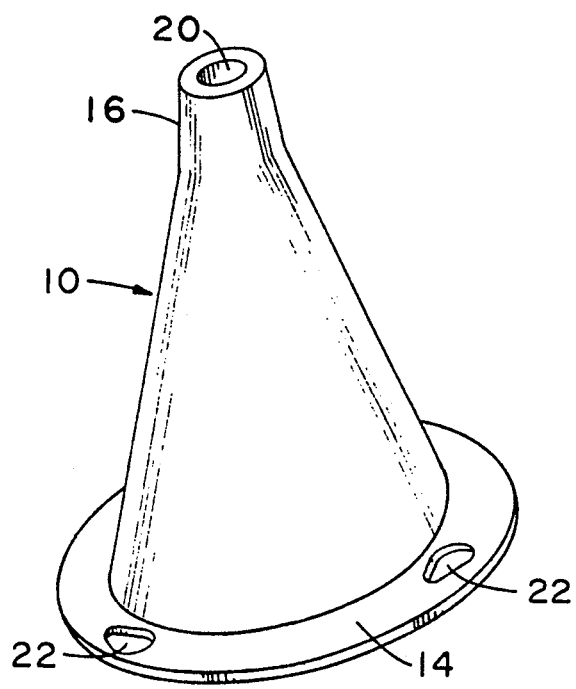

United States Patent [19]

Seksaria et al.

[11] Patent Number: 5,033,357
[45] Date of Patent: Jul. 23, 1991

[54] SPACER ATTACHMENT DEVICES

[75] Inventors: Dinesh C. Seksaria, Pittsburgh; James D. Klingensmith, Apollo; David N. Hansen, Murrysville, all of Pa.

[73] Assignee: Aluminum Company of America, Pittsburgh, Pa.

[21] Appl. No.: 451,019

[22] Filed: Dec. 15, 1989

Related U.S. Application Data

[63] Continuation-in-part of Ser. No. 243,508, Sep. 12, 1988, Pat. No. 4,905,569.

[51] Int. Cl.[5] .............................................. F41H 5/06
[52] U.S. Cl. .................................... 89/36.04; 403/167
[58] Field of Search ................ 89/36.01, 36.02, 36.04, 89/36.16, 36.08, 36.12; 403/167; 52/202, 262, 263, 782

[56] References Cited

U.S. PATENT DOCUMENTS

| H129 | 9/1986 | Hansen | 89/36.04 |
| 1,236,224 | 8/1917 | Stafford | 403/167 |
| 2,380,393 | 7/1945 | Berg | 89/36.02 |
| 3,014,563 | 12/1961 | Bratton | 403/167 |
| 3,785,610 | 1/1974 | Dagiel | 249/214 |
| 4,167,889 | 9/1979 | Bohne et al. | 89/36.02 |

FOREIGN PATENT DOCUMENTS 319284  1/1970  Sweden ................................. 52/263

Primary Examiner—Charles T. Jordan
Assistant Examiner—Stephen Johnson
Attorney, Agent, or Firm—Elroy Strickland

[57] ABSTRACT

An inexpensive light weight hollow frustum of a cone for suspending items on or from a host surface. The cone has a high strength-to-weight ratio provided by a thin wall of material forming the hollow cone. The cone has a bushing-like end at the apex thereof for receiving and holding the suspended item. An opening is provided in the bushing-like end for receiving a removable fastener. The base end of the cone is provided with a flange for receiving removable fasteners for securing and removing the cone and item to and from the host surface.

6 Claims, 1 Drawing Sheet

SPACER ATTACHMENT DEVICES

This application is a continuation-in-part of U.S. patent application Ser. No. 243,508 filed Sept. 12, 1988, now U.S. Pat. No. 4,905,569.

BACKGROUND OF THE INVENTION

The present invention relates generally to devices for supporting and suspending items, such as applique (auxiliary) armor panels to an armored vehicle surface. The invention is directed to hollow, light weight, high strength cone devices, more particularly, frusta of cones that are, in addition, inexpensive to produce. They provide a reliable, easy to use suspension and support system for such armor panels.

Over the years, a number of devices have been employed to hang armor on the armored surfaces of military vehicles. An early (1945) example of this is U.S. Pat. No. 2,380,393 to Berg. Berg secures spacers 5 to an armored surface 2. Each spacer includes a boss 6 that extends through an opening provided in an armor plate 3. A headed bolt 9 is threaded into the boss to secure the armor plate to the spacer and thus to the armored surface.

U.S. Pat. No. 4,167,889 to Bohne et al shows a solid rubber buffer (spacer) secured at its base to the surface of an armored vehicle by a collar 11 welded to the armored surface. A threaded bushing 7 is cast in the rubber spacer, at its outer end, for securing armor plate to the rubber buffer by a bolt 6 threaded into the bushing.

A similar structure by Bohn et al is shown in West German Patent DE 254214C1. Here, a thick wall tapered bearing 4 is supported in a rubber cone 6. Rubber cone 6 is in turn supported in a thick wall metal cone 5. The base of the bearing is wider than the inner diameter of the distal end of the housing so that the bearing cannot escape the housing if the rubber cone is destroyed.

U.S Pat. No. 4,545,296 to Fedij shows a half spherical steel spacer 26 welded or fused to the back side of an armored tile 12. The tile and spherical spacer are attached to the hull of an armored vehicle by a threaded bolt extending through the spacer and into the vehicle surface. When an incoming shell strikes the tile in an off centered manner the bolt breaks and the tile rotates about the rounded surface of the spacer.

A welded boss 56 similar to that of Berg is shown in U.S. Pat. No. 4,716,810 to DeGuvera. A nylon spacer 14 is secured to the welded boss for attaching armor plate to an armored surface.

There are, of course, many types of military vehicles on which applique armor may be mounted, as well as a multitude of other types of structures using spacer support systems. Each application has its peculiar characteristics and operating conditions, such as ballistic loading, vibrations and noises, etc. In providing applique armor for each vehicle type, it is desirable that a system for attaching armor be capable of being easily adapted and adjusted to the particular armor/vehicle system and their dynamic conditions.

Another challenge in designing systems to attach applique armor to a vehicle is to reduce the weight of attaching devices. It is desirable, of course, to reduce vehicle weight, and it can be appreciated that a large number of dense, hard bosses and bushings attached to the outside surface of the vehicle can add a substantial amount of weight to the vehicle. In addition, such bosses and bushings protrude outwardly from the vehicle surface. When they are not being employed to support applique armor they are subject to being snagged and broken off. Then, when it is desired to mount applique armor on the vehicle, the bosses will not be available. These bosses also require additional space in transport and storage of such vehicles, particularly in cramped quarters of a ship's hull, as well as in maneuvering the vehicle amongst trees and other obstacles that may be adjacent the path of vehicle travel.

A further problem with providing applique armor for military vehicles is the difficulty often encountered in the traditional attaching/removing process. What is needed in the art is a simple system for applying and removing applique armor to and from military vehicles, one that can be effected with a minimum of tools, effort and time under field and battle conditions.

SUMMARY OF THE INVENTION

It is therefore an objective of the present invention to solve the above problems in a low-cost, weight-efficient manner, and in a manner that allows one to adapt mounting devices to the conditions of a particular armor vehicle system or other uses and their environments. This objective is accomplished by a system of low-cost, easy to produce, hollow frusta of cone standoffs or spacers. As explained mathematically below, the standoffs are provided with the needed geometric configuration and material selection to achieve a high strength-to-weight ratio. The strength of the standoff cone is a function of both material strength and cross section properties, which include the cross section area moment of inertia (I); the moment of inertia increases at the fourth power of hollow cone diameter (d). By increasing the diameter, one reduces significantly the amount of cone material needed to support items on a host surface; and less material means less weight. This is seen from the example calculations below. If the truncated conical hollow stand off of the present invention is six inches long and has wall thickness of 0.05 inches and diameters of 2 and 4 inches at its narrow and base ends respectively and is made from a sheet of 2024-T4 aluminum alloy, the weight of this cone will be about:

$$W_{cone} \approx \left[ \frac{\pi(4'' + 2'')}{2} \right] \times 6'' \times .05'' \times .1 \text{ lbs/in}^3 \begin{pmatrix} \text{density} \\ \text{for aluminum} \end{pmatrix}$$

$$\approx .3 \text{ lbs.}$$

using a conservative, least favorable form of the subject invention. The force F (lbs) required to yield and fail the conical standoff by bending the standoff in a direction normal to the cone axis is given by the formula:

$$\text{stress } (\sigma) = \frac{\text{Force}(F) \times 6''}{Z}$$

where $\sigma$ = yield strength of material for 2024-T4 aluminum = 42,000 lbs per square inch.

$Z$ = Area Section Modulus (in$^3$)

$$= \frac{\text{Area Moment of Inertia }(I)\text{ in}^4}{\text{Distance in inches to outer surface }(C)}$$

$$I = \frac{\pi(4^4 - (4 - 2 \times .05)^4)}{64} = 1.2 \text{ in}^4$$

$C = 2'' \therefore Z = .6 \text{ in}^3$ $\therefore$ Strength $(F)$ of cone $= \frac{42{,}000 \text{ lbs/in}^2 \times .6 \text{ in}^3}{6 \text{ in}} = 4200$ lbs.

again, using a conservative cantelevered beam approach. To obtain the same bending strength from the traditional steel bolt also of 6" in length, again $$\sigma = \frac{F(6)}{Z}$$

In this case $\sigma_{yield} = 120{,}000$ PSI for steel SAE grade 8.2 bolt, where D is the diameter of bolt in inches, and $$Z = \frac{\pi(D^3)}{32}$$

Substituting in above and solving $$\therefore D_{stl} = \sqrt[3]{\frac{4200 \times 6 \times 32}{120{,}000 \times \pi}} = 1.3 \text{ in diameter}$$

The weight of such a bolt $$W_{steel} = \frac{\pi}{4}(D_{stl})^2 \times 6'' \times .3 \text{ lbs/in}^3 \text{ (density of steel)}$$

$$= 2.4 \text{ lbs}$$

$$\therefore \frac{W_{stl}}{W_{al\ cone}} = \frac{2.4}{.3}$$

or 8 times more for same strength of 4200 lbs. The above yield strength (PSI) for 8.2 grade steel bolt is found in SAE Standard J429—Aug. '83; Table 1, of 1989 SAE Handbook Volume 2, SAE, Warrendale, Pa. The formulas for stress and strain are provided by R. J. Roark, Table 1, 5th Edition, McGraw Hill Book Co., 1982, New York. The stress equation to determine inertia, I, is found on page 90, Chapter 7 of the same book.

Thus, a very light weight cone will have the high strength and stiffness of a massive steel bolt. Such a cone can, in addition, provide attenuation of vibrations originating with the vehicle to isolate such vibrations from the auxiliary armor.

The cones are easily attached to a host surface with removable fasteners when the cones are provided with appropriately located and sized openings, and auxiliary armor can be hung on the narrow apex ends of such cones when appropriate openings are provided in the armor to receive the apex ends. The armor is secured to the apex end by another removable fastener threaded into an appropriate opening provided in each apex end.

Hence, in the present invention, auxiliary armor panel can be attached to a vehicle surface without welding and be easily removed when removal is desired. (The cones can also be removed if desired to minimize outward protrusion.) The only tool needed by personnel working in the field to accomplish attachment and removal is a simple wrench or screw driver when the heads of the screws are so configured.

The cone devices of the invention can be made by known manufacturing processes and existing, relatively low cost tooling, using standard hardware, materials and manufacturing technology; the results are weight efficient, structurally sound, low cost devices for attaching spaced applique items to a host surface.

THE DRAWINGS

Figure 2:
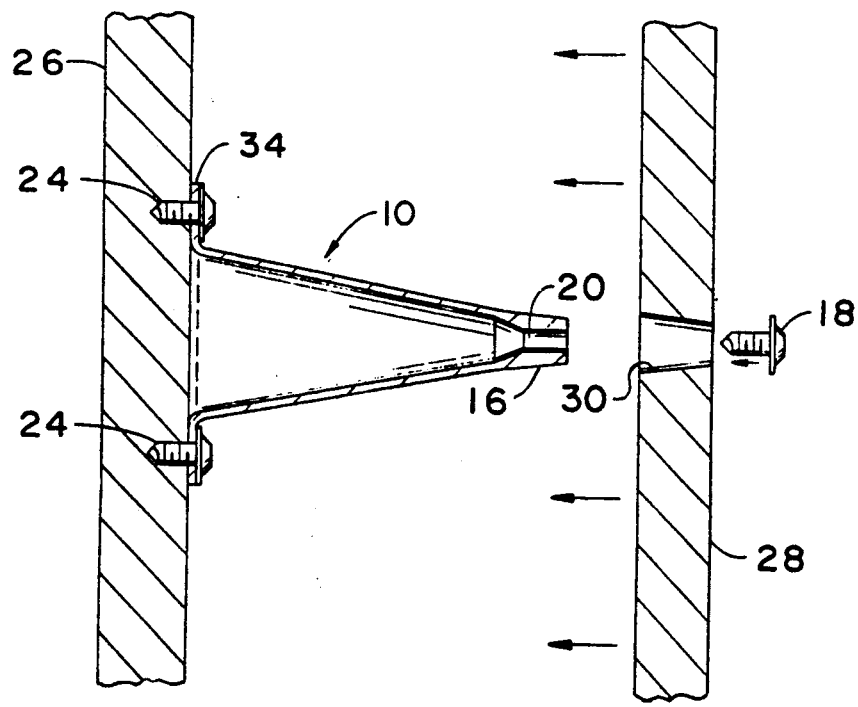

The invention, along with its objectives and advantages, will be best understood from consideration of the following detailed description and the accompanying drawings in which:

FIG. 1 is a perspective view of a preferred spacer embodiment of the invention; and FIG. 2 is a sectional view assembly using the embodiment of FIG. 1.

PREFERRED EMBODIMENTS

Referring now to FIG. 1 of the drawings, a hollow, thin wall cone frustrum 10 is shown in perspective. The thin wall of the frustrum structure tapers between its base and apex ends, and encloses a central axis of the structure. At the narrow or apex end of the cone is shown an integral tapered portion 16 (for receiving and holding an item 28 in FIG. 2), while fastening means, such as a fastener 18 (FIG. 2) is threaded into an opening 20 provided in the end of the tapered portion.

As shown further in FIG. 1, flange areas 14 are provided with openings 22 for the reception of fasteners 24 (FIG. 2). The openings can be circular, though a bayonet type opening is shown in FIG. 1. Fasteners 24 are employed to secure the cone to the surface of a host structure 26. The structure of 26 is provided with openings of appropriate diameter for receiving fasteners 24. Preferably, fasteners 24 are the same size as fastener 18 so that only one size fastener is employed in using the system of the invention. Suitable fasteners include buttonhead screws with integral washers.

In FIG. 2, host structure 26 may be the hull of a military vehicle. The openings provided in 26 are spaced apart by a distance equal to the distance between openings 22 in the base of cone 10. The task of attaching the cone is made easier if openings 22 are a bayonet type and the fasteners 24 are already located in the openings provided in host structure 26. This is important, for example, in attaching applique armor panel to the hull of a military vehicle. Military personnel working in the field and desiring to hang armor panel on a vehicle, simply back fasteners 24 part way out of the hull, align the bayonet holes in flanges 14 with the fasteners, slip the flanges past the heads of the fasteners, rotate the cone until the heads are located over the narrow portion of the bayonet opening, and then tighten fasteners 24 into the hull to secure the cone to the hull.

In the case of military vehicles, it is preferred to have fasteners 24 already located in hull 26. The reasons for this is to keep the openings free of mud, snow and/or ice (so that the fasteners can be quickly and easily employed for the attaching process), and t o protect the threads of the openings from damage for easy threading of the fasteners. Otherwise, separate plug means would be needed to fill the openings provided in the hull.

As best seen in FIG. 2 of the drawings, the apex end 16 of cone 10 is bushing-like to receive a panel 28, and a plurality of cones 10, say four, can be used to support one such panel. A like plurality of openings 30 are provided in the panel, and suitably spaced apart and sized to fit over the bushings. Panel 28 is then secured to the apex ends of the cones by simply directing fasteners 18 into openings 20 provided in the cone bushings.

The bushings 16 and openings 30 are both preferably tapered so that each opening 30 has a wide mouth for receiving the narrow end of its respective bushing 16, thereby greatly easing the task of disposing a panel on a cone. As mentioned earlier, bushing 16 also retains the panel before and while fastener 18 is threaded into opening 20 of the bushing. Again, such an arrangement facilitates the task of attaching applique panels to a host surface. This can be important when the activity takes place in the field and particularly under battle conditions.

Cone 10 can be made of a polymer, metallic or composite material. A composite material is one that is manmade from two or more different materials e.g. glass reinforced plastic made from glass fiber in a plastic matrix. The composition of the material, as well as its thickness, are parameters that can be chosen to provide a cost effective spacer structure that is tailored to the specific needs of a particular application in terms of strength, stiffness and damping capability, and one that is optimized in regard to strength-to-weight ratio. As discussed earlier, there are many different types of vehicles used by the military that employ applique armor panels. In addition, the size and weight of the armor panels for the many types of vehicles may be different, and other uses of cone structure 10 may involve designs different than those employed for armoring vehicles. The tooling and/or molds employed to make the cone structure are easily altered to meet design specifications and changes in specifications. Similarly, the material of cone 10 is easily changed to meet design specifications. For this reason, capital investment is not large in making the cone structure of the invention, and in making multiple cone systems. The axisymmetric shape of cone 10 is easily made by typical metal forming processes, such as spin forming technology. Spin forming is inexpensive such that the final product is low cost, weight efficient and structurally sound. Cone 10, of course, is easily produced by molding processes as well.

The base portion of cone 10 provides an additional flexibility in that flange 14 will tolerate and conform to uneven surfaces, and can be formed to mate with curvilinear contours of non-planer surfaces receiving the base of the cone. It can be appreciated that the perfectly planar surface of item 26 in FIG. 2 may not always be available, particularly when working with the military vehicles in the field that may have been subject to much use and abuse.

Because the cone structure of the invention can be structurally designed for specific applications, excess material in the cone structure is avoided, thereby avoiding waste and making efficient use of materials. The height, strength and stiffness of cone 10 is such that ballistic loading requirements are easily met. When a projectile strikes panel 28, the panel will be disposed a suitable distance from the vehicle hull by the cones such that the personnel in the vehicle are generally protected from the incoming projectile.

Additional dynamic damping capability is provided by cone 10 if the material of the cone is made of a polymer or other energy absorbing material, i.e., polymers have the ability to deform and thereby absorb the energy of vibration from a vehicle in the form of heat via a hysteresis-type phenomena, and subsequently release this heat (energy) to the atmosphere. This is effective in keeping vibrating forces originating with the vehicle from reaching the applique armor.

Another advantage of the invention is that screws 18 and 24 are loaded primarily in tension and in shear, and do not receive bending loads, thereby permitting the use of smaller and lighter weight fasteners. Further, the use of multiple fasteners improves the reliability of the attachment process, and the use of self-tapping screws, for example, results in a better fit between mating threads, and higher resistance to vibration loosening and fatigue. The result is a high performance and reliable armor attachment system for military vehicles and other uses.

While the invention has been described in terms of preferred embodiments, the claims appended hereto are intended to encompass all embodiments which fall within the spirit of the invention.

What is claimed is:

1. A hollow thin wall frustum of a cone member for supporting applique armor panel on a host surface, and for spacing said panel from said surface, said member being securable to and removable from the host surface by the use of removable fasteners, and the applique armor panel being securable to and removable from the member by a removable fastener, said member including:
   an end portion at the apex end of the member for receiving the applique armor panel, and for receiving said removable fastener,
   a base portion having an integral flange extending peripherally outwardly rom the base portion for attaching the member to the host surface with said removable fasteners, and
   a frustroconical continuous thin wall integral with and extending between the apex end portion and said flange, the thickness of said wall being considerably smaller than the linear extent of the wall such that the weight of the cone is negligible while its bending strength is comparable to that of a heavier steel bolt.

2. The member of claim 1 in which the flange has bayonet type openings to receive respective heads of the removable fasteners such that the member is secured to the host surface by rotating the member after the heads are inserted through said openings.

3. The member of claim 1 in which the material of the member is an aluminum alloy, with the thickness of the wall of the member being at least one order of magnitude smaller than the inside diameter of the base portion of the member.

4. The member of claim 1 in which its structure is that of a molded article made from an energy absorbing and dissipating composite material.

5. The member of claim 1 in which the host surface is an armored surface.

6. The member of claim 1 in which the apex end of the member is bushing-like.

* * * * *